(12) United States Patent
Friggstad (10) Patent No.: US 7,617,784 B2
(45) Date of Patent: Nov. 17, 2009

(54) DUAL ROW SEED DRILL

(75) Inventor: Terrance Alan Friggstad, Grasswood (CA)

(73) Assignee: CNH Canada, Ltd. (CA)

( * ) Notice: Subject to any disclaimer, the term of this patent is extended or adjusted under 35 U.S.C. 154(b) by 183 days.

(21) Appl. No.: 11/746,857

(22) Filed: May 10, 2007

(65) Prior Publication Data

US 2008/0276846 A1 Nov. 13, 2008

(51) Int. Cl.
- *A01C 5/00* (2006.01)
- *A01C 7/00* (2006.01)
- *A01C 9/00* (2006.01)
- *A01C 13/00* (2006.01)

(52) U.S. Cl. .................. 111/152; 111/186; 111/195
(58) Field of Classification Search ......... 111/118–120, 111/123–126, 129, 149, 152–156, 186–188, 111/190–196
See application file for complete search history.

(56) References Cited

U.S. PATENT DOCUMENTS 5,351,635 A * 10/1994 Hulicsko .................... 111/135

\* cited by examiner

*Primary Examiner*—Christopher J. Novosad
(74) *Attorney, Agent, or Firm*—Rebecca Henkel

(57) ABSTRACT

A seed drill planting apparatus includes an opener configured to plant a row of seeds at locations corresponding to the wing tips of the openers and a row of fertilizer at the center of the opener. The press wheels for the opener are constructed of a pair of skewed wheels that are arranged to throw soil inwardly to provide a proper cover for the rows of seeds and fertilizer placed into the ground by the opener. The skewed press wheels are connected to an adjusting mechanism that is operable to selectively vary the angle at which the press wheels are skewed with respect to the direction of travel. A one-way castering wheel is also provided to function to caster for tight turns on the side of the implement at the inside of the turn, but automatically locks into a stable position when the implement is converted into a transport position.

8 Claims, 6 Drawing Sheets

DUAL ROW SEED DRILL

FIELD OF INVENTION

The present invention relates generally to planting apparatus for planting seeds in the ground in an agricultural environment. In particular, the present invention relates to a configuration of a planting apparatus for planting small grains in conjunction with an air seeder.

BACKGROUND OF THE INVENTION

With the increasing trend to minimum or zero tillage seeding practices, much work has been done in the design of a ground engaging tool. This tool must open the soil and provide an optimum placement for the seed, preferably maximizing moisture, consistent and accurate soil coverage, and adequate displacement of fertilizer. Those openers that provide a separation of seed and fertilizer are called "double shoot" openers, as these openers require a dual delivery system to maintain proper separation between the seed and the fertilizer. The double shoot opener design typically creates a separate groove within the furrow formed in the soil to accept the two commodities. With increasing amounts of fertilizer being applied during planting operations, and with the unpredictable fracturing of soils due to variations in moisture content and malleability, the seed is often comprised with too much contact with raw fertilizer, causing the seed to be burned and preventing the seed from germinating.

This problem has been addressed by manufactures of planting implements by providing an extra set of openers between every second seed row, placing seed, for example, at 10 inch row spacings and having two adjacent seed rows feed off a single fertilizer row between the two seed rows, thus assuring adequate separation between the seed and the fertilizer. This configuration of a fertilizer row between every second seed row is called "mid-row banding". The seed rows are formed with furrows or grooves that are three to four inches for proper soil utilization and, as a result, there is significant soil disturbance. Furthermore, the rearmost rank of openers does not typically get as much "fall-back" of soil to cover the seed properly because there is no subsequent rank of openers that throw soil over to that row. This problem has also bee addressed by the installation of harrow tines that are operable to shift soil into the last formed seed row. With all of these openers and harrow tines, there is a substantial draft requirement for such an implement, requiring a substantially sized tractor to pull the implement. Furthermore, there is a significant loss of ground cover which contradicts the general principles of zero or low till planting operations.

Most shank-type seed drills are configured with three or four ranks of openers supported by wheels ahead of the front rank of openers and a row of press wheels behind the rear rank of openers. The distance between the wheels ahead of the front rank and the press wheels behind the rear rank is sufficiently large as to be subject to ground elevation irregularities that lead to inaccuracies in the depth at which the seeds are placed into the ground. Furthermore, the distance between the ranks of openers can cause misalignment when the drill slides to one side during side hill operations, often causing two seed rows to coincide and the press wheels to miss the row they were positioned to be packing.

Large implements of typical wing-up transport design are very bulky to transport over the public highways, interfering with other vehicular traffic and being jeopardized by overhead wires and highway overpasses. Accordingly, it would be desirable to provide an improved transport configuration for large implements to provide a more compact transport configuration without sacrificing operational requirements.

Accordingly, it is also desirable to provide a press wheel structure that are adjustable to vary the effect thereof for directing soil inwardly to cover seed rows.

SUMMARY OF THE INVENTION

Accordingly, an important object of the present invention is to provide an improved opener that provides proper separation between the rows of seeds being planted and the rows of fertilizer being placed into the ground.

It is another object of this invention to provide an improved press wheel apparatus to assure proper soil coverage of the seed rows during the planting operation.

It is a feature of this invention that the press wheels are formed by a pair of skewed wheels that direct soil inwardly as the wheels pass over the surface of the ground.

It is another feature of this invention that the skewed wheels are connected to an adjustment mechanism that is operable to vary the angle at which the press wheels are skewed with respect to the direction of travel.

It is an advantage of this invention that the adjustment in the skewing of the press wheels can very the amount of soil being thrown inwardly to cover the planted seed row.

It is still another object of this invention to provide an improved transport configuration for large tillage and planting implements.

It is still another feature of this invention that ground working tools are arranged on a common rockshaft that rotate from a working position to headland position wherein the press wheels are simply trailing and the implement boom carries the openers in an elevated position.

It is yet another feature of this invention that the trailing boom transport system retains a center group of openers without rotating into several vertical position.

It is still another advantage of this invention that the overall height of the implement in the transport position is not sufficiently high as to be jeopardized overpasses and overhead wires.

It is yet another object of this invention to provide a one-way castering wheel that will caster to allow tight turns, but lock in a stable position when the implement is converted into a transport position.

It is yet another advantage of this invention that the one-way castering wheels will automatically lock into a stable position when implement in converted into the transport position.

These and other objects, features, and advantages are accomplished according to the present invention by providing a seed drill planting apparatus including an opener configured to plant a row of seeds at locations corresponding to the wings tips of the openers and a row of fertilizer at the center of the opener. The press wheels for the opener are constructed of a pair of skewed wheels that are arranged to throw soil inwardly to provide a proper cover for the rows of seeds and fertilizer placed into the ground by the opener. The skewed press wheels are connected to an adjusting mechanism that is operable to selectively vary the angle at which the press wheels are skewed with respect to the direction of travel. A one-way castering wheel is also provided to function to caster for tight turns on the side if the implement at the inside of the turn, but automatically locks into a stable position when the implement is converted into a transport position.

The foregoing and other objects, features, and advantages of the invention will appear more fully hereinafter from a consideration of the detailed description that follows, in con-

BRIEF DESCRIPTION OF TH DRAWINGS

The advantage of this invention will be apparent upon consideration of the following detailed disclosure of the invention, especially when taken in conjunction with the accompanying drawings wherein.

DETAILED DESCRIPTION OF THE PREFERRED EMBODIMENTS

Figure 1:
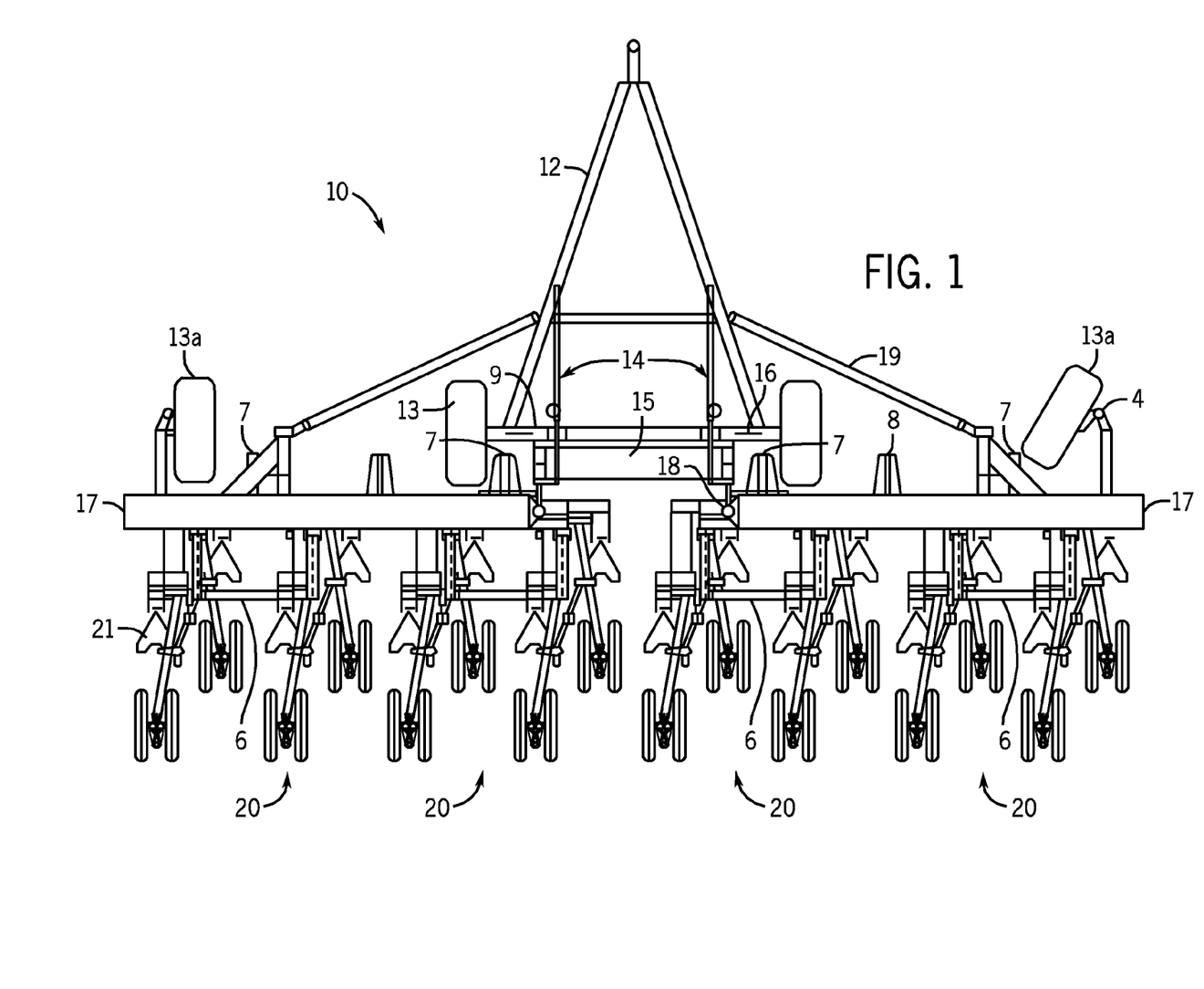
FIG. 1 is a top plain view of a drill incorporating the principles of the instant invention.
Figure 2A:
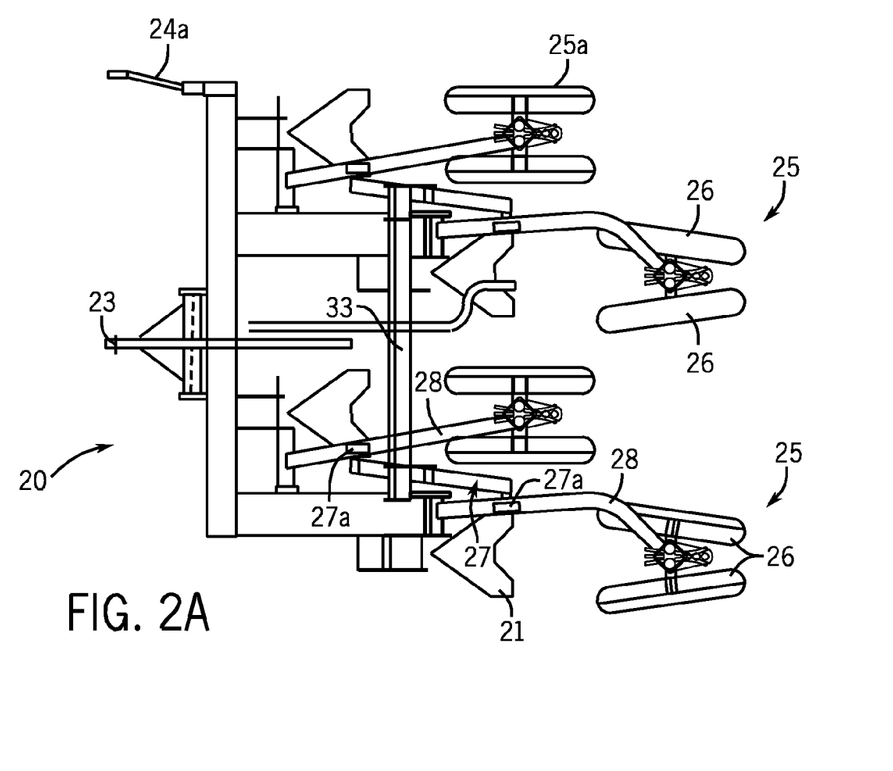
FIG. 2A is an enlarged to plan view of a group of openers from the drill depicted FIG. 1.
Figure 2B:
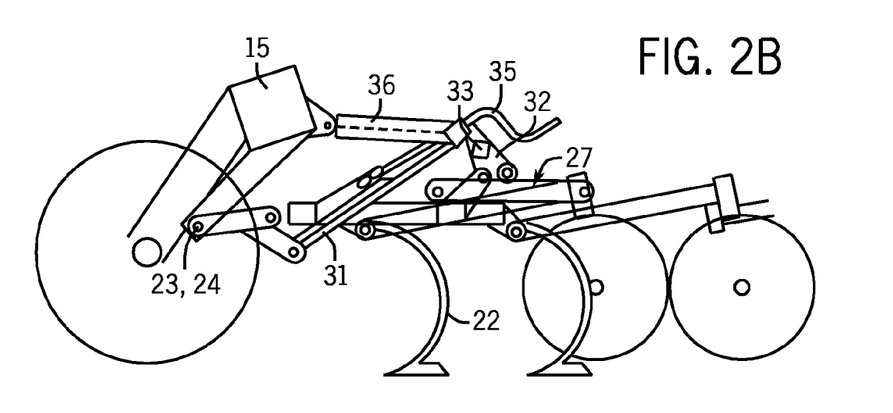
FIG. 2B is a side elevational view of the group of openers depicted in FIG. 2A.
Figure 3:
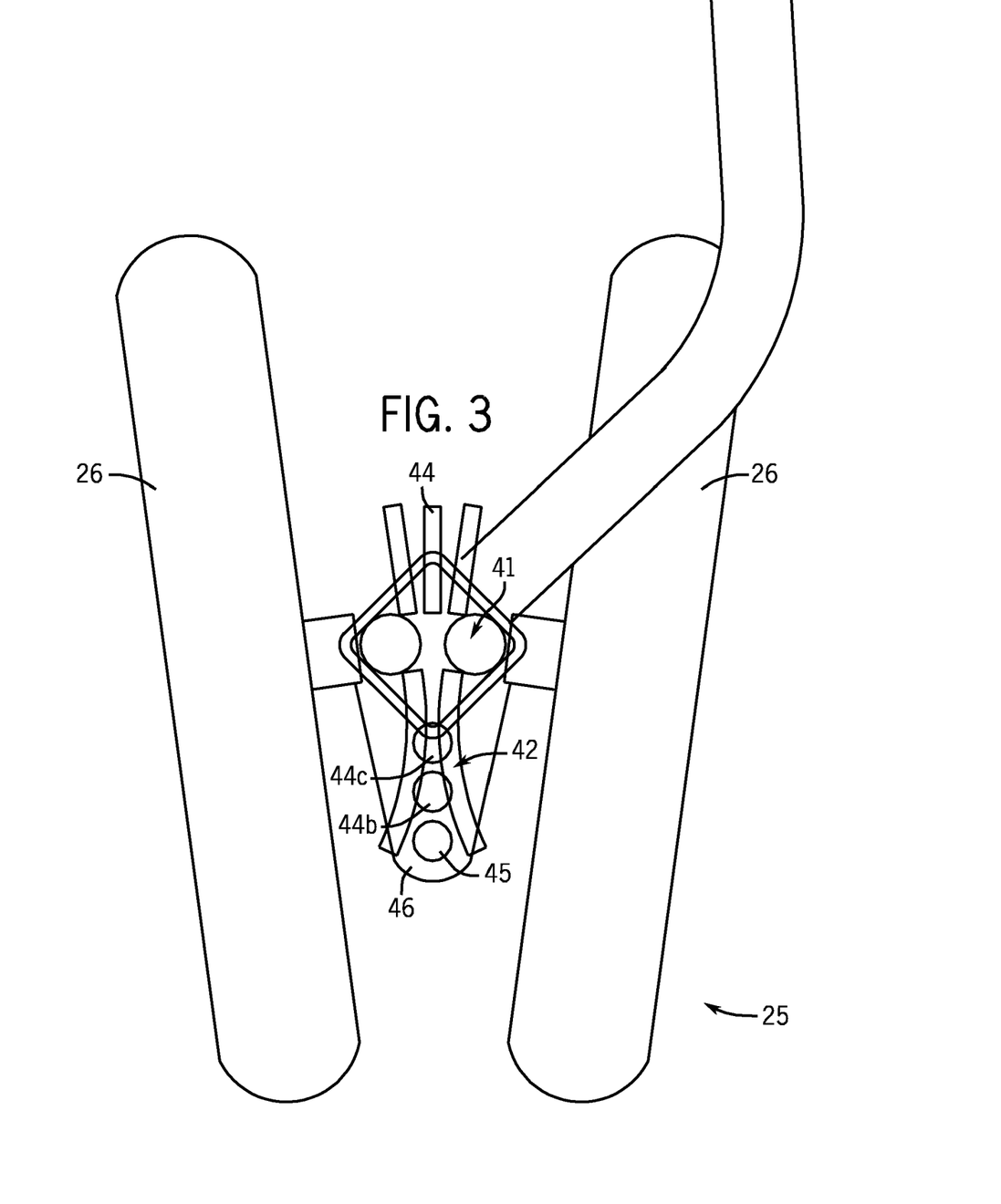
FIG. 3 is an enlarged top plan view of the drill depicted in FIG. 1 but oriented into a adjustment mechanism for varying the skew angle of the individual press wheels.

Referring to FIGS. 1-3, a planting implement in the form of a small drill incorporation the principles of the present invention can best be seen. Any left and right references are used as a matter of convenience and are determined by standing at the rear of the implement and facing into the direction of travel. The implement 10 includes a frame 11 incorporating a hitch member 12 is adapted for connection to a prime mover, such as a conventional tractor (not shown). The hitch 12 is attached to the center boom 15 to define a transversely extending pivot axis 16 about which the center 15 is rotatable to move between transport and operation configurations. The center boom 15 is connected to left and right wing booms 17 by knuckle joints 18 that permit wing booms 17 to rotated relative to the center boom 15.

Hydraulic cylinders 14 connect the center boom 15 to the A-frame-shaped hitch member 12 so that a retraction of the hydraulic cylinders 14 causes the center boom 15 and the wing booms 17 attached thereto to rotate about the transverse pivot axis 16. Support wheels 13 are mounted on the hitch frame 12, while wing support wheels 13a are mounted on the wing booms 17, for support of the implement 10 for movement thereof over the surface of the ground. For stability of the booms 17, draft links 19 connect the wing booms 17 to the hitch member 12.

The openers 21 are arranged in groups or modules 20 of four openers 21 per module 20. Each module 20 is connected to the boom 17 by a ball joint 23, defining a universal pivot connection having a transversely extending axis, and a companion link 24a joining an anchor 24 in alignment with the transversely extending axis of the ball joint pivot 23 so that each of the modules 20 are free to oscillate about the corresponding ball joint 23 while remaining aligned with respect to a vertical pivot axis extending through the ball joint 23 as the modules 20 are operated through the field.

Each module 20 includes four openers 21 preferably in the form of conventional shanks 22 equipped with conventional spring rock protection (not shown). The press wheel assembly 25 is mounted on the end of a trailing arm 28 pivotally mounted to the module 20 by a horizontally extending pivot axis 29. Each press wheel assembly 25 includes a pair of press wheels 26 that are supported for pivotal movement to define an adjustable skew angle for the individual wheels. In FIG. 2A, the press wheel assemblies 25 are depicted in different skew angles as a matter of illustration. The skew angle of the rightmost press wheel assembly 25a is set at zero skew. Other possible skew angles are at 5 and 10 degrees of skew, as will be described in greater detail below. The greater the skew angle, the more aggressive the press wheel assembly 25 will operate to move soil to cover the planted seed in the furrows formed by the shanks 22.

Each opener 20 also includes an evener 27 that is positioned transversely between each fore and aft corresponding pairs of shanks 22. The eveners 27 are preferably in the form of a short bar pivotally attached to the cross tube 33 of the module 20 and provided with a roller 27a at each end thereof to engage the trailing arms 28 for each of the fore-and-aft pairs of press wheel assemblies 25. The rollers 27a bear on the trailing arms 28 so that corresponding fore-and-aft pairs of trailing arms 28 can oscillate with changing ground elevations, but maintain an average depth for the shanks 22 served by the press wheel assemblies 25. Thus, the module 20 is supported by the trailing press wheel assemblies 25 and the ball connection 23 with the boom 17, as is best seen in FIG. 2B. A link 31 joins the bell crank 32 to the cross tube 33 so that rotation of the adjustment crank 35 causes simultaneous rotation of the bell crank 32 and the cross tube 33 to which the eveners 27 are attached, causing an even depth adjustment of the module relative to the boom 17 and the press wheel assembly 25. Two compression springs 36 link the boom 15, 17 to each end of the cross tube 33. As the boom 15, 17 rotates the unit into the ground, the springs 36 are compressed to apply force in the form of the weight of the boom 17 to the module 20 for adequate ground penetration of the shanks 22 and the proper packing of the soil by the press wheel assemblies 25. The module 20 is free to float about the ball joint 23 to permit the module 20 to follow ground contours.

The press wheel assemblies 25 are formed with an adjustment mechanism 40 that is coupled to the individual press wheels 26 to define the angle of skew of the press wheels 26. Each press wheel 26 is mounted on a spindle unit 41 for rotation about a generally vertical axis to orient the press wheel 26 relative to the direction of travel. Each spindle unit 41 includes a stop member 42 formed in a curved shape and moveable with the press wheel 26. Each stop member 42 is oriented above a position plate 46 having three holes 47 therein. A pin 45 is selectively positionable within one of the holes 47a which, when the curved stop member 42 moves into engagement with the pin 45, sets the press wheel 26 at a ten degree skew angle.

The positioning of the pin 45 in the middle hole 44b sets the press wheels at a five degree angle, while the forwardmost hole 44c set a zero degree skew, or a straight ahead position. Each stop member 42 has a forward position 43 that also rotates with the press wheel 26 such that the forward portions 43 engage a central stop 44 when the press wheels 26 are set in the zero skew position, thus preventing the press wheels 26 from moving into a negative skew angle. Furthermore, the movement of implement 10 into a transport position, as will be described in greater detail below, places the press wheels 26 into the zero skew position irrespective if the location of the pin 45 because of the weight of the press wheels 26 and the offset position of the spindle axis 41 relative to the press wheels 26. The central stop member 44 prevents the press wheels 26 from moving beyond the zero skew position.

The five degree skew position enhances the packing process as a result of a "smearing" action accomplished by the slightly skewed individual press wheels 26, which also keeps the press wheels 26 free of mud. By adjusting the skew angle, the coverage of the soil over top of the seed rows can be tailored to suit the seed type and moisture conditions. Furthermore, the soil moved to the center of the opened soil path corresponding to the openers 21 to cover the fertilizer placed at the center of the path, as will be described in greater detail below, can be enhanced by more aggressive ten degree skew angle position, which is particularly important id anhydrous ammonia is used as the fertilizer.

Figure 4:
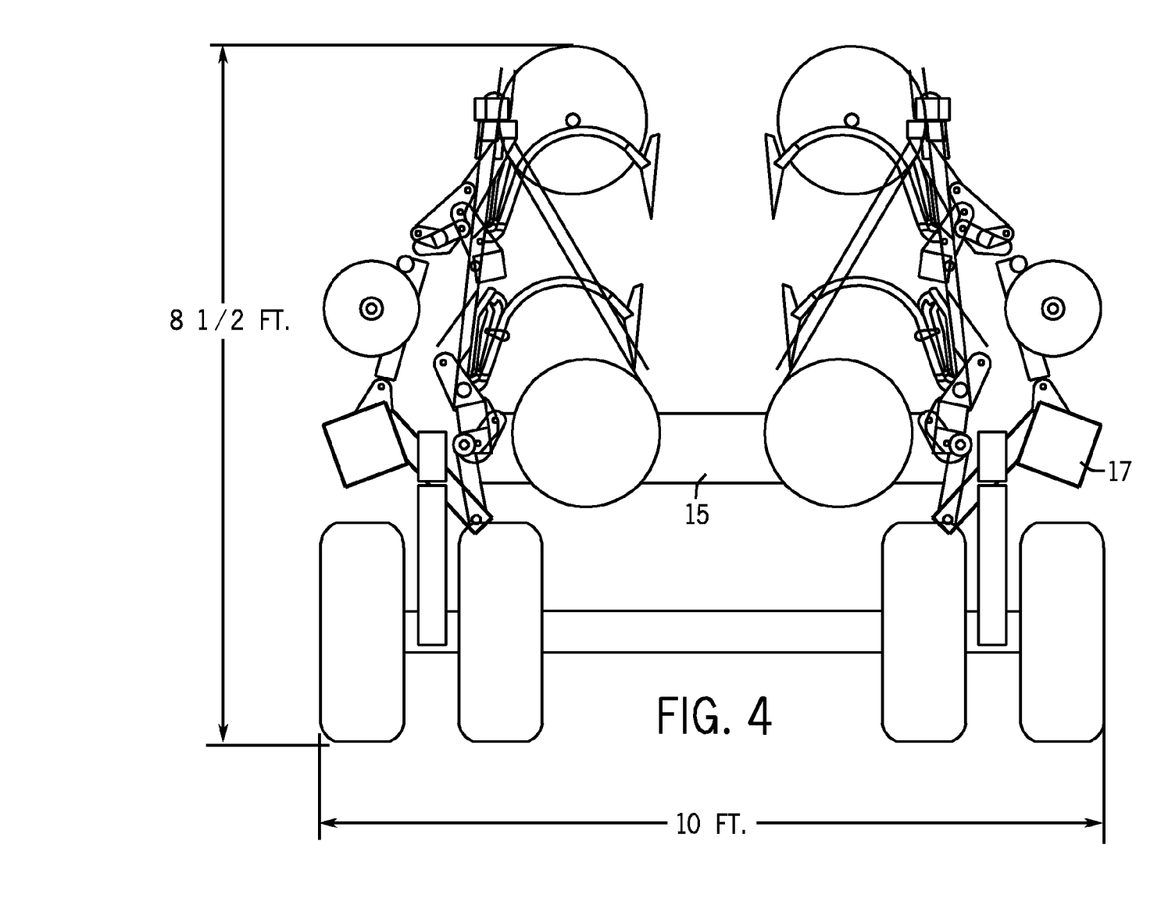
FIG. 4 is a rear elevational view of the drill depicted in FIG. 1 but oriented into a transport position with the openers placed into an elevated configuration.

Referring no to FIG. 4, the transport position of the implement 10 can best be seen. The booms 15, 17 are rotated by hydraulic cylinders (not shown) through a rotation of approximately 90 degrees forwardly to rotate the modules 20 from a normal generally horizontal working position, as depicted in FIG. 1, to a generally vertical transport position depicted in FIG. 4. The wing booms are then pivoted rearwardly about the knuckle joints 18 so that the modules 20 are then oriented to face each other as shown in FIG. 4. The rearward press wheel assembly 25 is permitted to rotate about the pivot connection 29 of the corresponding trailing arm 28 so as to fold downwardly, thus providing a compact transport position that is only approximately 8½ feet above the surface of the ground. Returning the implement 10 to the operating position will return the trailing press wheel assembly 25 to the normal position because gravity will rotate the corresponding trailing arm 28 about the pivot 29 to position the rear press wheel assembly 25 into an orientation to engage the ground and move rearwardly as the module 20 is lowered into a working position.

Figure 5:
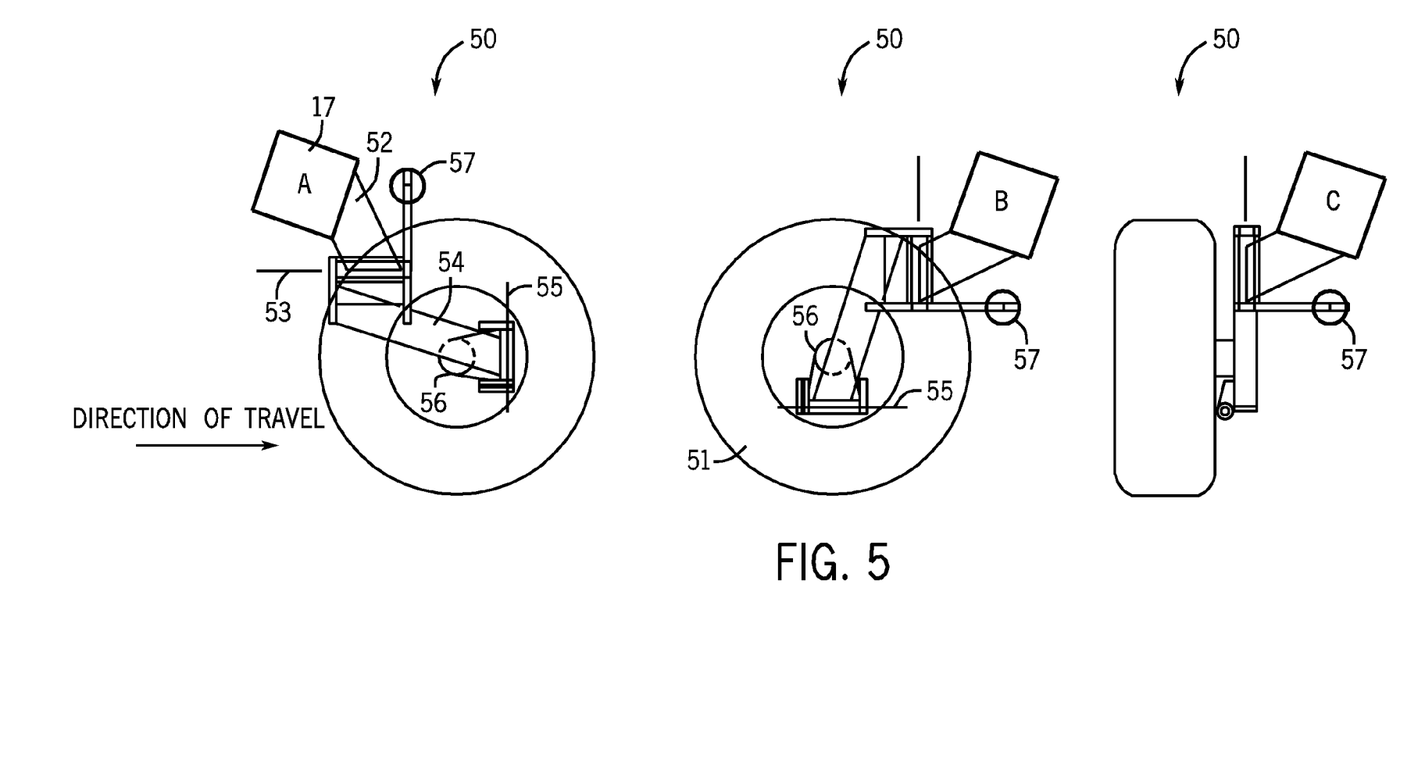
FIG. 5A is an enlarged side elevational view of the one-way caster wheel in the field operating position.
FIG. 5B is a side elevational view of the one-way caster wheel similar to that of FIG. 5A but with the implement boom having been partially rotated toward the transport position.
FIG. 5C is a side elevational view if the one-way caster wheel similar to that of FIG. 5B but with the implement boom having been fully rotated into the transport position.
Figure 6:
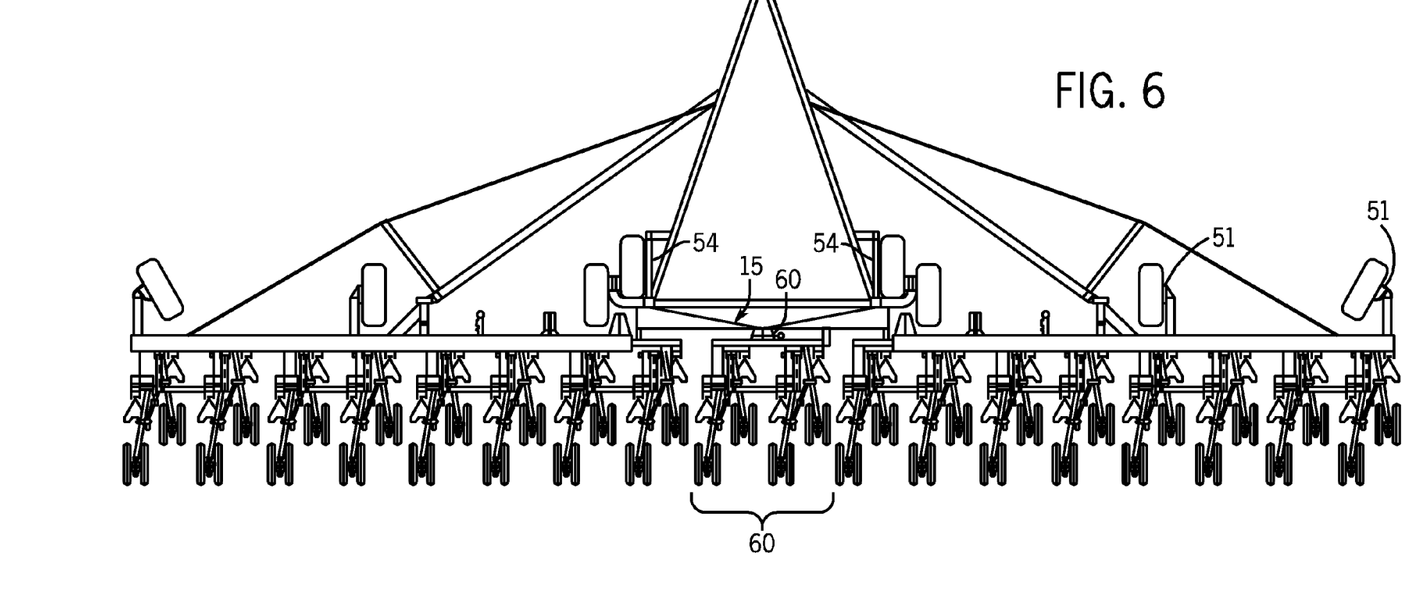
FIG. 6 is a top plan view if a large drill implement showing the castering movement of the one-way caster wheels at the ends of the implement wings.

Referring now to FIGS. 5A through 5C, the details of the one way caster wheel assembly 50 can best be seen. The wing boom 17 mounts a caster wheel assembly 50 at the remote outer end thereof to support the wing boom 17 above the surface of the ground. The wing boom 17 mounts the upper leg member 52 of the caster wheel assembly 50 in a fixed position. A lower leg member 54 of the caster wheel assembly 50 is attached to the upper leg member 52 by a pivot 53 defining a generally horizontal, longitudinally extending pivot axis when the implement 10 is in the normal working configuration, as depicted in FIG. 5A. A hydraulic cylinder 57 maintains the orientation of the lower leg member 54 relative to the upper leg member 52 with respect to the pivot 53. The caster wheel 51 is mounted on a mounting bracket 56 which, in turn, is pivotally attached to the lower leg member 54 by a pivot 55 defining an offset pivot axis that is generally vertical when the implement 10 is in the operating position of FIG. 5A, but offset from the axis of rotation of the wheel 51. In this normal operating configuration, the caster wheel 51 is free to rotate about the pivot mechanism 55 when the caster wheel 51 is on the inside of a turn, which is depicted in FIG. 6, to help the implement 10 corner around a turn. The position of the lower leg member 54 blocks the pivotal movement of the mounting bracket 56 when the caster wheel assembly 50 becomes the outside wheel on a turn of the implement 10.

As the implement 10 has been converted into the transport configuration, the boom 17 is rotated through 90 degrees to position the pivot 53 so that the axis thereof is now generally vertical, as depicted in FIGS. 5B and 5C, and the pivot 55 is re-oriented into a generally horizontal position. The caster wheel 51 can no longer move about the pivot 55 to effect a castering movement, thus causing the wheel 51 to become a fixed support wheel. The hydraulic cylinder 57 can be activated when the boom 15, 17 has been rotated into the transport configuration to pivot the lower leg member 54 relative to the upper leg member 52 through the pivot 53 to re-orient the wheel 51 into a position that will facilitate the re-positioning of the wing booms 17 into a rearwardly extending transport position.

In FIG. 6, a large implement 10 is depicted in which the center boom 15 is larger than in the configuration of the implement 10 depicted in FIG. 1. In the large implement 10 of FIG. 6, the center boom 15 is provided with a module 60 to span the gap between the modules 20 on the inner ends of the opposing wing booms 17. The re-configuration of this large implement 10 into a transport position is substantially identical to that described above with respect to FIG. 4, except that the module 60 on the center boom 15 is connected to the center boom 15 by a pivot 62 so that the center module 60 remains horizontal when the boom cylinders 14 rotate the booms 15, 17 into the transport configuration. The horizontal orientation of the center module 60 when in the transport position enables the modules 20 on the wing booms 17 to be positioned over top of the center module 60 without interference therebetween.

In general, the above-described implement 10 utilizes a typical cultivator sweep as an opener 21 on the shanks 22 to open the soil wide enough to create two seed rows at the desired transverse spacing. In the way of an example, an 11 inch sweep will create an opening sufficiently wide to accommodate 10 inch row spacings with seed delivery tubes to direct seed into two properly spaced rows underneath the sweep 21, one under each wing of the sweep. A separate delivery tube can then be positioned at the center of the sweep 21 to provide a fertilizer row at 20 inch centers to feed the two seed rows to either side thereof. Therefore, a module 20 having sweeps 21 mounted on 20 inch centers will be operable to provide 10 inch seed row spacing with alternate fertilizer rows on 20 inch spacings located no more than 5 inches from any seed row. If complete mechanical weed kill is required by the operator, a 22 inch sweep 21 can be utilized to provide complete ground coverage of the modules 20.

Depth control for each sweep 21 is accomplished by the rear trailing packer wheel assemblies 25. Mid-row banding of fertilizer can be accomplished with the above-described implement 10 with one-third of the number of openers 21 that are conventionally required to accomplish such an operation. With fewer openers 21, the draft load of the implement 10 is lower and wider implement configurations are made possible. In fact, wider implements 10 are facilitated due to the simplicity of the implement design. Instead of the typical wing fold transport configuration, other folding configurations can be utilized because of the frame depth of the modules 20 is minimal and a substantial amount of torque to effect a rolling of the booms and rock shafts is not required.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. An agricultural planting implement comprising:
a frame adapted for movement over a field in a direction of travel; and
a plurality of planting modules supported on said frame for planting seed into the ground at a desired row spacing, each planting module including:
at least one sweep having a width greater than the desired row spacing, said sweep being operable to make an opening in the ground for the placement of seeds therein, said opening being defined by lateral sides of said opening;
a seed placement mechanism operable to place seeds into two rows at the desired spacing adjacent the lateral sides of said opening;
a fertilizer placement mechanism operable to place fertilizer into said opening substantially midway between said lateral sides of said opening; and
a closing device trailing said seed placement mechanism and said fertilizer placement mechanism operable to cover said seeds and said fertilizer with soil displaced by said sweep; wherein said closing device includes a pair of press wheels mounted for rotation about non-parallel axes so that each said press wheel is angled with respect to said direction of travel; wherein said pair of press wheels is oriented in a rearwardly converging manner; wherein said closing device further includes an adjustment mechanism for varying the angle at which each respective said press wheel is oriented to the direction of travel; wherein said press wheels set seed depth.

2. The agricultural planting implement of claim 1, wherein said adjustment mechanism includes:
a stop member associated with each of said respective press wheel and positioned adjacent the stop plate of the opposing said press wheel;
a generally horizontal position plate having a plurality of apertures extending vertically therethrough; and
a removable pin engaged with a selected one of said apertures to engage with said stop members and define a minimum lateral spacing therebetween and thereby vary the angle at which said press wheels are oriented with respect to the direction of travel.

3. The agricultural planting implement of claim 2, wherein said press wheels can be oriented at a skew angle in the range of zero to ten degrees.

4. In an agricultural planting implement having a frame adapted for movement over a field in a direction of travel and a plurality of planter assemblies supported on said frame for planting seed into the ground at a desired row spacing, said planter assemblies including a device opening the ground, a device for placing seed into the ground, a device for placing fertilizer into the ground, and a closing device trailing said seed placement device and said fertilizer placement device to cover said seeds and said fertilizer with soil displaced by said ground opening device, the improvement comprising:
said closing device including a pair of press wheels skewed with respect to the direction of travel in an orientation converging rearwardly to move soil laterally over said seeds and said fertilizer; wherein said press wheels set seed depth.

5. The agricultural planting implement of claim 4, wherein said closing device further includes an adjustment mechanism for varying the angle at which each respective said press wheel is oriented to the direction of travel.

6. The agricultural planting implement of claim 5, wherein said adjustment mechanism includes:
a stop member associated with each of said respective press wheel and positioned adjacent the stop plate of the opposing said press wheel;
a generally horizontal position plate having a plurality of apertures extending vertically therethrough; and
a removable pin engaged with a selected one of said apertures to engage with said stop members and define a minimum lateral spacing therebetween and thereby vary the angle at which said press wheels are oriented with respect to the direction of travel.

7. The agricultural planting implement of claim 6, wherein said press wheels can be oriented at a skew angle in the range of zero to ten degrees.

8. The agricultural planting implement of claim 4, wherein said opening device includes at least one sweep having a width greater than a desired row spacing, said sweep being operable to make an opening in the ground for the placement of said seeds therein, said opening being defined by lateral sides of said opening, said seed placement device being operable to place said seeds into two rows at the desired spacing adjacent the lateral sides of said opening and said fertilizer placement device being operable to place said fertilizer into said opening substantially midway between said lateral sides of said opening.

* * * * *